July 25, 1961
R. A. ALCOTT
2,993,969
CONTROL APPARATUS
Filed July 28, 1958
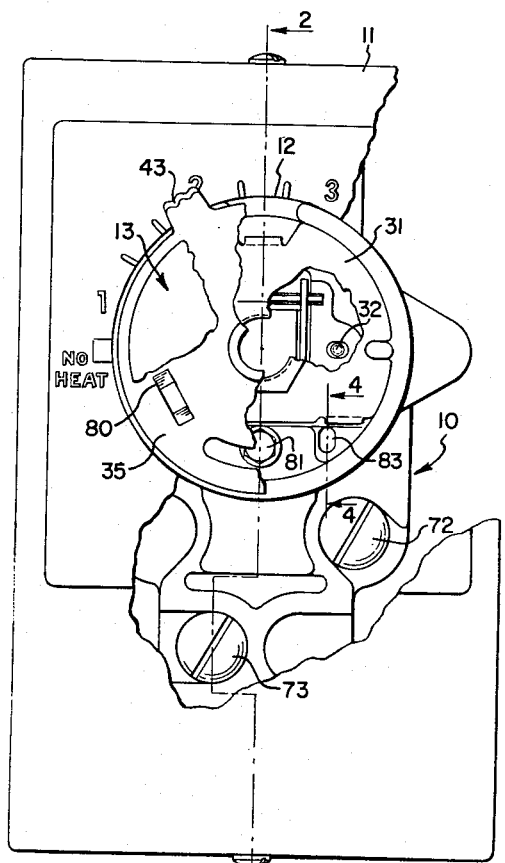
Fig.1
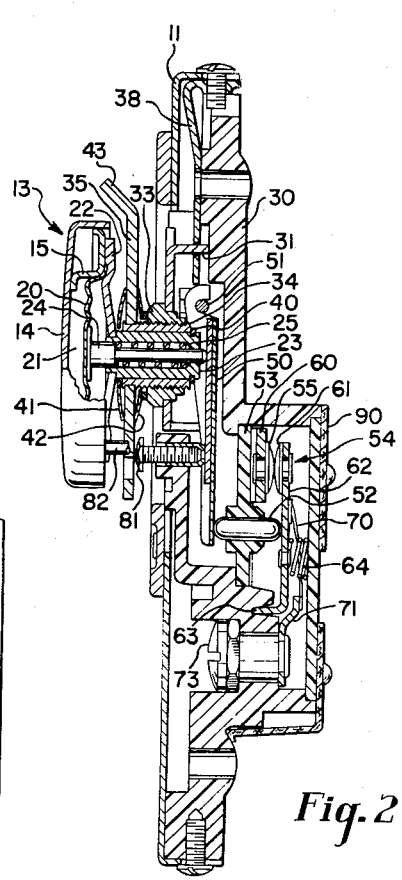
Fig.2
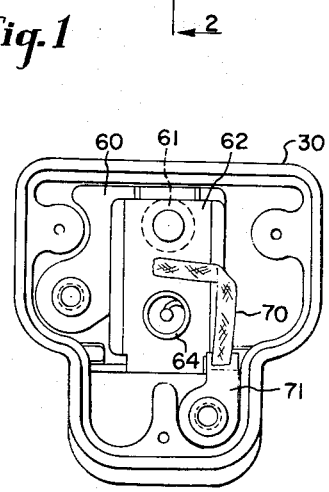
Fig.3
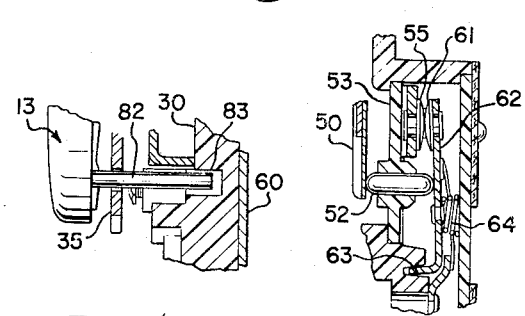
Fig.4
Fig.5
INVENTOR.
ROLLIN A. ALCOTT
BY
*Clyde C. Blinn*
ATTORNEY

United States Patent Office 2,993,969
Patented July 25, 1961

2,993,969
CONTROL APPARATUS

Rollin A. Alcott, St. Louis Park, Minn., assignor to Minneapolis-Honeywell Regulator Company, Minneapolis, Minn., a corporation of Delaware
Filed July 28, 1958, Ser. No. 751,514
3 Claims. (Cl. 200—140)

The present invention is concerned with an improved space thermostat; in particular, a thermostat having a fluid filled sensing element sensitive to radiant heat and air temperature for controlling a slow make switch for electric heating.

The use of electric heating is becoming more and more common and the need for an inexpensive and yet reliable thermostat for controlling small electric heaters has been recognized for a long time. A thermostat for such an application generally should have the sensing element mounted outside of the casing. A radiant heat thermostat of this type heretofore has not been too well adapted to the application of heat anticipation. In the present thermostat, a means is provided for conducting a portion of the electric heat developed in the switch to the sensing element to off-set the control point of the sensing element to provide the heat anticipation. Another problem which is quite common with electric heater thermostats is short contact life. In order to increase the performance of this thermostat and keep the differential of the thermostat low, the movable member of the switch is of the floating type; so that, when contacts of the switch weld, the normal pivot point of the operating member of the switch is able to lift and the movable contact of the switch rocks to break the weld.

It is therefore an object of the present invention to provide an improved space thermostat.

Another object of the present invention is to provide an improved space thermostat having means integral with a sensing element for thermally connecting the sensing element and an electric switch.

Still another object of the present invention is to provide a space thermostat with an improved switch mechanism.

These and other objects of the present invention will become apparent upon a study of the following specification and drawing of which:

FIGURE 1 is a front view of the thermostat having a portion cut away to show a portion of the working mechanism inside the casing;

FIGURE 2 is a side section view of the thermostat shown in FIGURE 1;

FIGURE 3 is a rear view of the switch of the thermostat shown in FIGURE 2;

FIGURE 4 is a portion of the sensing element of the thermostat shown in FIGURE 2 having the extension from the sensing element to conduct heat from the switch to the sensing element; and FIGURE 5 is a second cut away view of the switch shown in FIGURE 2 with the operating member being pivoted about the welded contacts.

Referring to FIGURE 1, the thermostat is made up of a switch assembly 10 to which a cover 11 is attached. Cover 11 has a circular opening 12 through which a sensing element 13, which is attached to assembly 10, is inserted. The sensing element is then mounted exteriorly of the cover 11.

Referring to FIGURE 2, sensing element 13 is made of a cup 14 which has a washer insert 15 attached to the inside of the cup for supporting a flexible diaphragm 20. A sealed chamber 21 is formed by the flexible diaphragm, washer, and the bottom portion of the cup when assembled to house the fluid which makes up the temperature sensitive portion of the sensing element. A three-legged bracket 22 is attached to washer 15 to support the sensing element on a stem or bushing 23. Only one leg of bracket 22 is shown in FIGURE 2. A pin 24 which is spring biased against the center of the flexible diaphragm 20 passes through a hole in bushing 23; so that, when the fluid in chamber 21 expands upon a temperature rise, pin 24 is moved to the right against spring 25 to provide the operating force for the switch of the thermostat.

The main body or casing 30 of the switch has a bracket 31 which is attached to casing or housing 30 by screws 32 (one of which is shown in FIGURE 1). Bracket 31 touches a ground strap 38 which also connects cover 11 to ground when the switch is mounted on a wall box in the conventional manner. Bracket 31 has a nut 33 attached thereto for receiving a left hand threaded bushing 34 attached to a control point adjustment plate 35. The stem 23 is held in bushing 33 by means of a retaining washer 40 attached to the far right end of stem 23. A pair of spring washers 41 and 42 are resilient spacers to keep the assembly tight; so that, when adjustment plate 35 is rotated in a clockwise direction, the left hand threads of bushing 34 moves sensing element 13 outward to increase the control point temperature of the thermostat. Attached to adjustment plate 35 is a pointer 43 which cooperates with appropriate indicia on the cover.

Contained inside main body 30, as shown in FIGURE 2, is a lever 50 which is pivoted about a fixed support 51; so that, as pin 24 of the sensing element moves to the right, the lever rotates in a counter-clockwise direction to move pin 52 through bushing plate 53 to apply a force to lever 62 to operate switch 54.

Switch 54 is made up of a fixed contact 55 attached to a terminal 60 and a movable contact 61. A lever 62 has movable contact 61 connected to one extremity and is pivotally supported loosely at an opposite extremity 63. Pin 52 engages lever 62 on one side intermediate movable contact 61 and extremity 63. A bias spring 64 applies a force on the opposite side of lever 62 from pin 52, intermediate the point of contact of pin 52 on the lever and extremity 63. Upon pin 52 moving to the right under the force of the sensing element applied through lever 50 floating lever 62 pivots about point 63 to separate contacts 55 and 61. If the contacts have welded or stuck due to arcing on the previous making operation, lever 62 is free to lift from its pivot point 63 when pin 52 applies the same force as shown in FIGURE 5. Lever 62 would then pivot about the movable contact 61 and such action would break the contact weld to restore the normal operation of the switch.

The electrical circuit is completed from movable contact 61 through lever 62 and a flexible lead 70 to a second terminal 71. Terminals 60 and 71 are connected to the thermostat control wires by means of the screws 72 and 73 shown in FIGURE 1. The location of these terminals and the floating lever 62 are better shown in FIGURE 3.

Adjustment plate 35 has a detent 80 shown in FIGURE 1 which cooperates with pin 81 shown in FIGURE 2 when pointer 43 is in the "no heat" position. The detent moves pin 81 to the right so that through lever 50 and pin 52, floating lever 62 is moved to the right to open the switch and insure positive off for "no heat."

The sensing element is filled by means of a fill tube 82 shown in FIGURE 2. When tube 82 is sealed off, the tube provides a thermal connection between the sensing element and the switch to conduct heat to the sensing element when the switch is closed for heat anticipation. FIGURE 4 shows the sealed off fill tube 82 extended into a hole 83 in body 30. The portion of the body adjacent terminal 60 is heated by switch 54. Heat is then transferred to the fill tube 82, and as the liquid therein expands the total volume of the liquid in sensor 13 increases to lower the control point of the thermostat. Each time switch 54 closes, heat anticipation is provided when switch heat increases the temperature of tube 82.

Operation

As shown in FIGURE 1, the thermostat is set at a control point just below the indicia No. 2 printed on the front of cover 11 by the adjustment of adjustment plate 35 and pointer 43. The clockwise movement of pointer 43 to a higher position on the indicia, such as near No. 3, withdraws bushing 34 to move sensing element 13 outward with respect to the switch casing 30. The new position of sensor 13 requires more movement of pin 24, to the right as shown in FIGURE 2, before switch 54 will open. As the fluid in chamber 21 expands upon a temperature rise, diaphragm 20 moves pin 24 to the right, and pin 52 presses on the left side of member 62 to lift the movable contact 61 off of the fixed contact 55 to open the switch.

During the operation of the thermostat with switch 54 closed, terminal 60 conducts current through the switch and to terminal connection 72. As the current passes through terminal 60, the surrounding area becomes warm and a portion of this heat increases the temperature of the fill in tube 82 to lower the control point of the thermostat. Pin 52 moves to the right more than would be the case without the heat anticipation obtained through the fill tube.

The movement of the upper end of member 62 during the operation of the switch in an opening direction has a given ratio depending upon the dimensions of the linkage connecting the sensing element to the pin 52. Once the sensing element has increased in temperature sufficiently to open the switch by removing the upper end of member 62 to the right against the outer cover 90 of the casing 30, further movement causes the lower end of member 62 to lift the pivot point 63. By providing the loose pivoted extremity 63, a strain release is provided for overtravel should the sensing element increase in temperature beyond the normal operating range. By the proper adjustment of the thermostat and the proper selection of the size of the components, the unit can withstand a high temperature. Without floating switch member 62, more room must be allowed for member 62 to move to the right as pin 52 exerts the force in that direction during the overtravel condition.

During normal operation, member 62, as shown in FIGURE 2, pivots about extremity 63 whenever the fluid in chamber 21 expands to move pin 52 to the right. As slow-make switches controlling electric heater experience a considerable amount of contact arcing and frying, the contacts 55 and 61 will weld almost every time the contacts come together to turn on an electric heating load. Obviously, a switch having welded contacts requires a greater amount of force to open the switch; therefore, a prying action is provided to assist in breaking the contact weld with a low force. Assuming that the contacts 55 and 61 are welded as shown in FIGURE 5, a force on pin 52 to the right will result in movement of the lower extremity of member 62 to the right against the force of spring 64. In other words, member 62 is pivoted about contact 55 to rock or to pry loose contacts 55 and 61 when the sensing element 22 reaches the temperature at which the heating source is to be turned off. As soon as the contacts 55 and 61 become loose, member 61 would rotate clockwise until the lower extremity of the member would drop into its normal pivot position and the movable contact 61 would move away from the fixed contact 55.

While it is obvious that other configurations might be made by one skilled in the art, it is intended that the scope of the present invention be limited by the appended claims, in which I claim:

1. In a space thermostat, a casing, a switch enclosed in said casing and adapted to control a heating device for delivering heat to a space, a temperature sensitive element disposed exteriorly of and adjacent to a wall of said casing, said element being adapted to respond to the temperature of the space, said element having a sealed chamber filled with fluid which expands upon an increase in temperature, mechanical connection means connecting said switch and said element so that said switch is actuated upon an increase in said element temperature above a control point temperature, said switch developing heat when in the closed position, and a fluid filled leg attached to said temperature responsive element and forming a part of said chamber, said leg extending into said casing close to said switch so that switch heat is transferred to said leg to readjust the control point temperature of the thermostat a predetermined amount to provide heating anticipation.

2. In a thermostat, a main body, a switch enclosed in said body, a liquid filled temperature sensitive element mounted exterior of said body, adjustable means connecting said switch and said element so that said element is adapted to close said switch at a predetermined thermally associated with said switch to be affected by heat developed by said switch, said filled means being an integral part of said element for modifying the effect of said element on said switch for heat anticipation.

3. In a space thermostat having heat anticipation, a switch adapted to energize an electrical circuit when closed, a fluid filled temperature sensing element responsive to space temperature, means connecting said element to control the operation of said switch, and heat transferring means for conducting heat from said switch to said element to modify the effect of said space temperature on said switch, said heat transferring means being a fluid filled extension of said element positioned in thermal contact with said switch to be affected by the heat developed when said switch is closed.

References Cited in the file of this patent

UNITED STATES PATENTS

| | | |
|---|---|---|
| 1,676,923 | Phelan et al. | July 10, 1928 |
| 2,199,357 | Dillman et al. | Apr. 30, 1940 |
| 2,625,630 | Eckles | Jan. 13, 1953 |
| 2,671,840 | Sway | Mar. 9, 1954 |
| 2,739,204 | Garner et al. | Mar. 20, 1956 |
| 2,827,534 | Grayson | Mar. 18, 1958 |

FOREIGN PATENTS

| | | |
|---|---|---|
| 447,672 | Great Britain | May 22, 1936 |